June 10, 1969  P. E. L. A. GRAVISSE  3,448,963
SAFETY BARRIER
Filed June 14, 1968
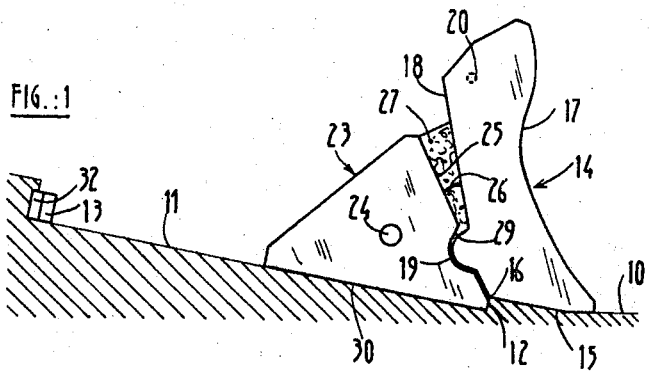
FIG.:1
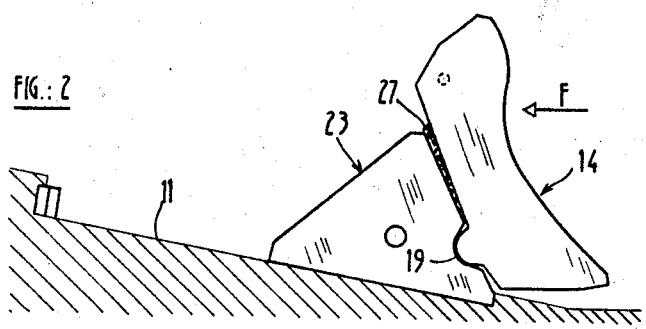
FIG.:2
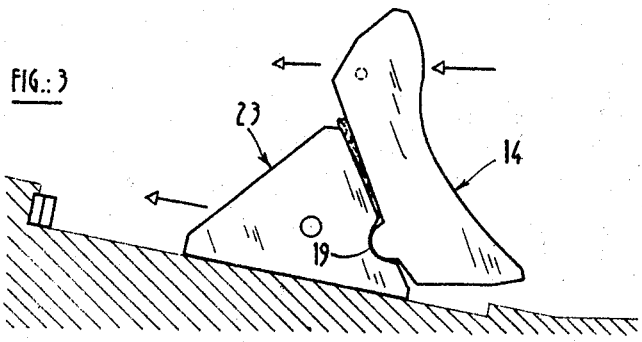
FIG.:3
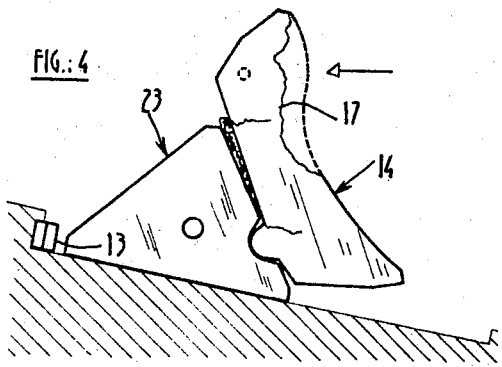
FIG.:4

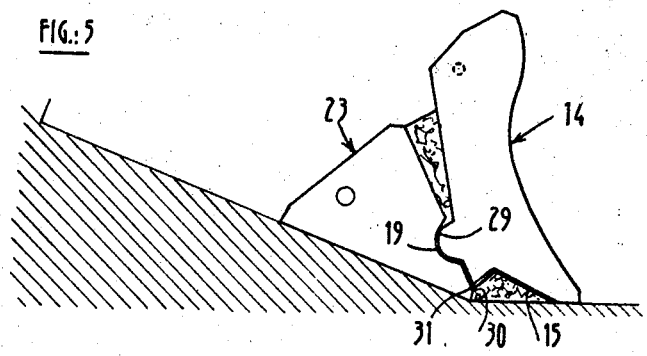
FIG.: 5
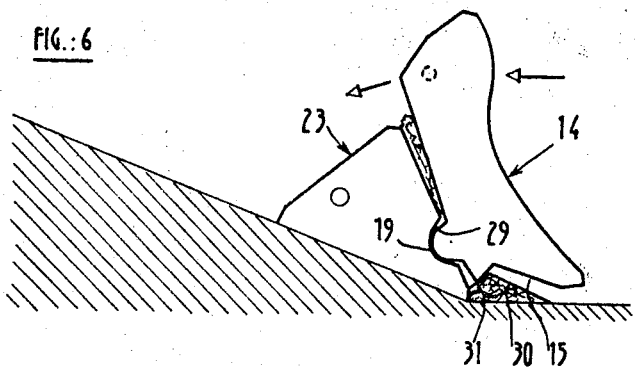
FIG.: 6
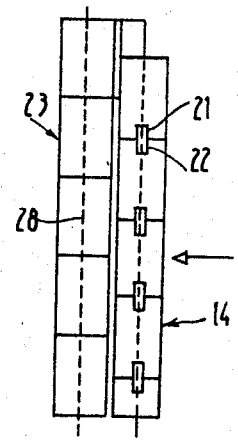
FIG.: 7

United States Patent Office 3,448,963
Patented June 10, 1969

3,448,963
SAFETY BARRIER
Philippe Edouard Léon Alexis Gravisse, 14, Allee H.
Sellier, 92, Puteaux, France
Filed June 14, 1968, Ser. No. 737,019
Claims priority, application France, June 28, 1967,
112,274
Int. Cl. E01f 15/00; E01c 11/22
U.S. Cl. 256—13.1                    7 Claims

ABSTRACT OF THE DISCLOSURE

Safety barrier made up of rigid elements connected with one another. The barrier is so designed that the elements which undergo the impact of a vehicle are displaced by the impact and take along with them the adjacent elements; thus the deformations undergone by the vehicle and the elements are strongly lowered.

---

This invention relates to a security barrier for expressways and constructive works.

It is known to dispose a safety barrier along an expressway or a constructive work.

The known barriers are usually rigid. Depending on the type of the barrier and on the magnitude of the transverse component of the kinetic energy of the vehicle which runs into the barrier, only the vehicle or both the vehicle and the barrier undergo permanent deformations. The barrier according to the invention is so designed as to absorb energy rather than resist the impact.

It has also already been proposed to manufacture a barrier made of a member of rigid elements so connected to one another that, when a vehicle runs strongly enough into one element or two successive elements, this one element or these two elements are severed from the other ones, which are therefore not deformed by the impact.

The barrier according to this invention is also made up of rigid elements connected with one another, but is so designed that the element or elements which undergo the impact of a vehicle are displaced by the impact and take along with them the adjacent elements. The permanent deformations undergone by the vehicle and by the elements subjected to the impact are thereby strongly lowered.

The barrier according to the invention comprises substantially juxtaposed front blocks lying along a roadway and each of which has a substantially plane back surface remote from the roadway substantially juxtaposed back blocks lying behind the front blocks with respect to the rodway, each of which is provided with a bore parallel to the roadway axis and has a substantially plane front surface forming with the back surfaces of the neighboring blocks an acuate angle whose summit points downwardly, a compressible substance filling this acute angle and a cable passing through the bores of a plurality successive back blocks and whose ends are wider than the cable and cannot enter the bores.

The accompanying drawings schematically show two embodiments of the barrier according to the invention.

FIGS. 1 to 4 are diagrammatic cross-sections of a first embodiment of the barrier:
  FIG. 1 before an impact;
  FIG. 2 at the beginning of the impact;
  FIG. 3 shortly after the impact;
  FIG. 4 in their final position after the impact.
FIGS. 5 and 6 are diagrammatic cross-sections of a second embodiment;
  FIG. 5 before an impact;
  FIG. 6 after an impact;

FIG. 7 is a schematic plan view of a barrier according to the invention.

In FIG. 1, 10 is an expressway and 11 one of its lateral side lanes. The lateral side 11 is an extension of the roadway 10 through a descending step 12. It has a slope which is ascending when moving away from the roadway and is preferably comprised between 0 and 20° and amounts for example to 10°. The lateral side 11 is followed by a recess limited by a wall 32 at right angles with the lateral side 11. A girder 13 lies in this recess.

A front concrete block 14 is placed on the roadway 10. It has a lower face 15 whose back end is situated above the step 12 and which accurately engages the surface of the roadway 10. The front face 17, which faces the roadway, of the block 14 is inclined rearwardly from bottom to top and is internally curved. The back face 18 has near its lower end a bulge 19. Except for this bulge 19 the back face 18 is slightly inclined rearwardly from bottom to top.

As appears from FIG. 7 the blocks 14 are contiguous. Each of them is provided with a cylindrical bore 21 on each of its two lateral faces. A linking cylinder 22, for example made of steel, fills the two successive cylindrical bores 21.

Back concrete blocks 23 are disposed behind the blocks 14. They are also contiguous. Their lengths, parallel with the road axis, are the same as those of the front blocks 14, with which they are staggered. Each of them has a lower face 30, which exactly engages the lateral side 11 and its front face 25 has a rounded recess 29 which engages the bulge 19 and forms, above the recess 29, with the back face 18 of the front blocks situated in front of it, an acute angle whose summit points downwardly. Each back block 23 is provided with a bore 24 parallel with the road axis. Blocks 27 made of a compressible substance fill the acute angle 26.

A cable 28 passes through the bores 24 of several successive back blocks 23. Its ends are wider than the cable and so designed that they cannot enter the bores 24. For instance each end of the cable 28 enters a housing made of cast aluminum through an opening in the housing and it ends in a head located inside the housing and which cannot pass through the opening. A spring is conveniently provided between the head and the wall provided with the opening. One housing can have two openings facing each other and enclose two heads belonging to two successive cables. The housing is lodged between two back blocks, which are therefore not contiguous. A cable can for instance have a length of 50 meters.

The operation of the barrier according to the invention appears from FIGS. 1 to 4.

It is assumed that the front end of a vehicle, instead of following a line substantially parallel with the road axis, follows an oblique line whose projection on the plane of the drawing, which is perpendicular to the road axis, is the arrow F (FIG. 2). As a consequence of the impact of the vehicle against a front block 14, the latter first tilts about its protruding portion 19, as shown by FIG. 2, thus squeezing the compressible substance at 27. The front block 14 then moves backwards, at the same time pushing the two back blocks lying between it and carrying along, on account of the two linking cylinders 22, the two front blocks 14 between which it is situated. At the same time as the back blocks 23 move backwards, as shown by FIGS. 3 and 4, they climb the slope of the lateral side 11. These back blocks 23 in turn carry along with them the neighboring back blocks on account of the connection provided by the cable 28. The front block 14 finally assumes the position shown in FIG. 4, in which its front face 17 deformed by the impact has been shown. If the kinetic energy of the impact has been great enough, the back block 23 has climbed as far as the girder 13, by which it has been stopped.

A useful effect is naturally obtained irrespective of the magnitudes of the elements of the barrier according to the invention. The following numerical values may be considered as an acceptable compromise between the several practical requirements:

Weight of the front block 14
      kg. per linear meter__ 220
Weight of the back block 23 _____do____ 300
Diameter of the steel cable 28 _____mm__ 30
Characteristics of the cable steel—
 Tensile strength _____kg./mm.² __ 60
 Breaking-strength _____kg./mm.² __ 100
 Elasticity coefficient _____ 28,000

The ascending backward movement of the front blocks 14 and of the back blocks 23 absorbs all the more energy and the barrier is all the more efficient as the slope of the lateral side 11 is greater. If however the slope is too great, the component parallel to the lateral side 11 of the effort applied, in the arrangement of FIGS. 1 to 4, by the front block 14 to the back block 23 becomes two small for the back block to glide over the lateral side 11. In order to avoid this possible drawback, the lower face of the front block 14 has such a shape that the rotation of the bulge 19 in the recess 29 causes the front block 14 and therefore also the back block 23 lying behind to rise.

This modification is shown by FIGS. 5 and 6. The lower face 15 of the front block 14 is here hollow-shaped and reaches the back face 18 of the block along an edge 31. The roadway has a protruding part 30 engaging the hollow face 15. When the bulge 19 of the front block 14 tilts in the recess 29 of the back block 23, the edge 31 rises while engaging the protruding part 30, and the bulge 19 carries along in its ascending motion the recess 29 and therefore also the back block 23, which can therefore glide along the lateral side 1.

In FIG. 1, 20 designates a bore through the front block 14. A cable may be provided therethrough, which makes integral a number of successive front blocks 14.

I claim:

1. A safety barrier comprising substantially juxtaposed front blocks lying along a roadway and each of which has a substantially plane back surface remote from the roadway substantially juxtaposed back blocks lying behind the front blocks with respect to the roadway, each of the back blocks being provided with a bore parallel to the roadway axis and having a substantially plane front surface forming with the back surfaces of the neighboring front blocks an acute angle whose summit points downwardly, a compressible substance filling this acute angle and a cable passing through the bores of a plurality successive back blocks and whose ends are wider than the cable and cannot enter the bores, said barrier being adapted to move when struck.

2. A safety barrier according to claim 1, in which said two faces have, below said compressible substance, a rounded recess and a bulge engaging said recess.

3. A safety barrier according to claim 2, in which said recess and said bulge are provided in said front face of said back block and said back face of said front block respectively.

4. A safety barrier according to claim 2, in which the lower face of said front block has such a shape that the rotation of said protruding part in said recess causes said front block and therefore also the back blocks lying behind it to rise.

5. A safety barrier according to claim 1, in which said front blocks and said back blocks are staggered.

6. A safety barrier according to claim 1, in which a bore parallel to the road axis is provided in each of said front blocks, and a cable, whose ends cannot enter said bores, passes through the bores of several successive front blocks.

7. A safety barrier according to claim 1, in which each front block is provided with a cylindrical bore on each of its two lateral faces and a linking cylinder fills two successive bores.

References Cited

UNITED STATES PATENTS

| | | | |
|---|---|---|---|
| 895,243 | 8/1908 | Davis | 94—31 |
| 1,067,501 | 7/1913 | Brown | 94—31 |
| 2,994,255 | 8/1961 | Trief et al. | 94—31 |
| 3,210,051 | 10/1965 | Case | 256—13.1 |
| 3,326,099 | 6/1967 | Cova et al. | 256—13.1 X |

FOREIGN PATENTS

| | | |
|---|---|---|
| 1,173,501 | 7/1964 | Germany. |
| 334,548 | 1/1959 | Switzerland. |

DENNIS L. TAYLOR, *Primary Examiner.*

U.S. Cl. X.R.

94—31